US010255660B2

(12) United States Patent
Grahn et al.

(10) Patent No.: US 10,255,660 B2
(45) Date of Patent: Apr. 9, 2019

(54) METHODS, DEVICES AND COMPUTER PROGRAM PRODUCTS FOR DEMOSAICING AN IMAGE CAPTURED BY AN IMAGE SENSOR COMPRISING A COLOR FILTER ARRAY

(71) Applicant: Sony Mobile Communications Inc., Tokyo (JP)

(72) Inventors: Håkan Grahn, Karlskrona (SE); Stefan Petersson, Lyckeby (SE); Jim Rasmusson, Vellinge (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 15/594,641

(22) Filed: May 14, 2017

(65) Prior Publication Data

US 2017/0337664 A1    Nov. 23, 2017

(30) Foreign Application Priority Data

May 23, 2016   (EP) .................................... 16170899

(51) Int. Cl.
*G06T 3/40* (2006.01)
*G06T 7/49* (2017.01)
*G06T 7/90* (2017.01)

(52) U.S. Cl.
CPC .............. *G06T 3/4015* (2013.01); *G06T 7/49* (2017.01); *G06T 7/90* (2017.01); *G06T 2207/10024* (2013.01); *G06T 2210/52* (2013.01)

(58) Field of Classification Search
CPC ............................... G06T 3/4015; G06T 7/49
See application file for complete search history.

(56) References Cited

U.S. PATENT DOCUMENTS

| 2002/0186309 | A1* | 12/2002 | Keshet | .................. G06T 3/4015 348/272 |
|---|---|---|---|---|
| 2012/0026178 | A1 | 2/2012 | Kasperkiewicz | |
| 2016/0217548 | A1 | 7/2016 | Yun | |

OTHER PUBLICATIONS

European Search Report from corresponding European Application No. 16170899.5, dated Dec. 8, 2016.
Jeon, Gwanggil, "Different Color Union for 8 Single Sensor Interpolation", International Journal of Control and Automation, vol. 7, No. 2, Feb. 28, 2014, pp. 397-404.
McGuire, Morgan, "Efficient, High-Quality Bayer Demosaic Filtering on GPUs", Journal of Graphics Tools, Association for Computing Machinery, New York, vol. 13, No. 4, 2008, pp. 1-16.

* cited by examiner

*Primary Examiner* — Antonio A Caschera
(74) *Attorney, Agent, or Firm* — Tucker Ellis LLP

(57) ABSTRACT

The present disclosure generally relates to the field of demosaicing an image captured by an image sensor including a color filter array, and more specifically relate to such a demosaicing operation using the GPU, shaders of the GPU and built-in rasterization function of the GPU.

15 Claims, 5 Drawing Sheets

METHODS, DEVICES AND COMPUTER PROGRAM PRODUCTS FOR DEMOSAICING AN IMAGE CAPTURED BY AN IMAGE SENSOR COMPRISING A COLOR FILTER ARRAY

RELATED APPLICATION DATA

This application claims priority to European Patent Application No. 16170899.5, filed May 23, 2016, the disclosure of which is incorporated herein by reference in its entirety.

TECHNICAL FIELD

The present disclosure generally relates to the field of demosaicing an image captured by an image sensor comprising color filter array, and more specifically relate to such a demosaicing operation using the GPU, shaders of the GPU and built-in rasterization function of the GPU.

BACKGROUND OF THE INVENTION

A demosaicing (also de-mosaicing, demosaicking or debayering) algorithm is a digital image process used to reconstruct a full color image from the incomplete color samples output from an image sensor overlaid with a color filter array (CFA). It is also known as CFA interpolation or color reconstruction.

These days it is common to do advanced image processing on GPUs (Graphics Processor Units), since the GPUs provide high performance and better energy efficiency compared to perform the processing on the CPU (Central Processing Unit).

It would thus be advantageous to do the bayer demosaicing on the GPU as well, but preferably in a more energy efficient way than the standard pixel or compute shaders described in prior art.

It is within this context that the present disclosure lies.

SUMMARY OF THE INVENTION

In view of the above, an objective of the invention is to solve or at least reduce one or several of the drawbacks discussed above. Generally, the above objective is achieved by the attached independent patent claims.

According to a first aspect of the present invention, this and other objectives are achieved by a method for demosaicing an image captured by an image sensor comprising a color filter array, the method comprising the steps of:

receiving, by a graphical processing unit, GPU, a texture corresponding to the captured image, the texture having a mosaic pattern with a first, second and third color, each pixel in the texture having a color component from only one color of said first, second and third color, wherein 25% of the pixels in the texture have a color component from the first color, wherein 25% of the pixels in the texture have a color component from the second color, wherein 50% of the pixels in the texture have a color component from the third color, from the texture, defining four grids, each grid defining a plurality of pixel positions in the texture, wherein a first grid define pixel positions of all pixels of the texture having a color component from the first color, wherein a second grid define pixel positions of all pixels of the texture having a color component from the second color, wherein a third grid define pixel positions of 50% of the pixels of the texture having a color component from the third color, wherein a fourth grid define pixel positions of a remaining 50% of the pixels of the texture having a color component from the third color, for each grid and each pixel position in the grid, initiating a vertex shader of the GPU and provide as an input to the vertex shader the pixel position, wherein the vertex shader extracts the color component corresponding to the pixel position in the texture and outputs the pixel position and the corresponding color component of the pixel position, for each grid and using the output from the vertex shaders, defining a plurality instances of a patch primitive type, each instance of the patch primitive type comprising four pixel positions forming a quad, and the color component corresponding to each of the four pixel positions, for each instance of the patch primitive type, initiating a geometry shader of the GPU, and provide as an input to the geometry shader the instance of the patch primitive type, wherein the geometry shader defines two instances of a triangle primitive type from the instance of the patch primitive type based on an order of the pixel positions comprised in the instance of the patch primitive type, wherein each instance of the triangle primitive type comprises three pixel positions forming a triangle, and the color components corresponding to each of the three pixel positions, and outputs the two instances of the triangle primitive type, using a built-in rasterization function of the GPU for rasterization of each instance of the triangle primitive type outputted by the geometry shaders of the GPU, such that all pixel positions of the texture each corresponds to a color component of the first color, a color component of the second color and two color components of the third color, inputting each pixel position of the texture and the corresponding color components of each of the first, second and third color to a pixel shader of the GPU, and forming an image based on outputs of the pixel shader, wherein all pixels of the image have a color component from each of the first, second and third color.

By the term "patch primitive type" (or just "patch") should, in the context of present specification, be understood a data structure (primitive) with a user-defined number of vertices, for example four pixel positions forming a quad. This primitive is supported by some GPUs, for example those implementing OpenGL 4 or later, or Direct3D 11 or later. Each patch of vertex data may be subdivided into smaller primitives in the rendering pipeline (also known as Tessellation).

By the term "triangle primitive type" (or just "triangle") should, in the context of present specification, be understood a data structure (primitive) formed by 3 vertices.

The built-in rasterization function of the GPU may function as described in the rasterization rules for Direct3D 11. Any other suitable rasterization rule may apply.

In the context of the present specification, all data elements processed before the rasterization step are stored within vertex points. In other words, the data points of the grids originate from the pixel positions of the texture but in this context may be considered as vertex points containing pixel position data.

It should be noted that the input to the vertex shader should be the pixel center positions, i.e. x+0.5, y+0.5. Consequently, the first, second, third and fourth grid may define such pixel center positions. According to other embodiments, the grids define e.g. x and y, and the addition of the 0.5 to each of the x-, and y-value is made before inputting the value to the vertex shader.

It should be noted that by specifying the output type of the geometry shader as two triangle primitive types, the Tessellation process (e.g. defining of the two triangles) may be done implicitly during execution of the shader. In other words, the geometry shader will define two instances of the triangle primitive type from the instance of the patch primitive type.

Since two grids defining the pixel positions of the pixels of the texture having a color component from the third color exist, i.e. a third grid define pixel positions of 50% of the pixels of the texture having a color component from the third color, wherein a fourth grid define pixel positions of a remaining 50% of the pixels of the texture having a color component from the third color, each pixel position will after rasterization correspond to two color components of the third color. These two will then be blended together or otherwise added to each other, to form a single color component in the final image, as will be further described below.

The inventors have realized that by using the built-in rasterization function of the GPU, which includes an interpolator in fixed-function silicon/hardware (which is normally used by the rasterization stage of the 3D graphics pipeline), an energy consumption similar to a dedicated camera processing chip (which typically has the Bayer interpolator implemented as fixed function hardware) can be achieved when performing Bayer demosaicing. Consequently, the functionality of such dedicated camera processing chip can be implemented by the GPU and a more cost efficient Bayer demosaicing can be achieved.

According to some embodiments, the method further comprises the steps of: prior to the step of defining two instances of a triangle primitive type by the geometry shader, calculating, by the geometry shader, a first difference between the color components corresponding to a upper left pixel position in the quad, and a lower right pixel position in the quad, and a second difference between the color components corresponding to a upper right pixel position in the quad, and a lower left pixel position in the quad, and reorder the pixel positions comprised in the instance of the patch primitive type in case the second difference is larger than the first difference.

When the method operates on 3×3 pixel quads, the geometry shader can order the pixel positions in the quad such that the rasterization can be done with either of two different diagonal settings. In order to choose the best diagonal partitioning of the quad, the absolute difference between the diagonally positioned pixels in the quad may be calculated. Advantageously, this may improve the resulting image quality of the interpolation when there is edges present in the region defined by the pixel positions in the quad.

In a second aspect, the present invention provides a computer program product comprising a computer-readable storage medium with instructions adapted to carry out the method of the first aspect when executed by a device having processing capability.

In a third aspect, the present invention provides a graphical processing unit, GPU, arranged for demosaicing an image captured by an image sensor comprising a color filter array, wherein the GPU is arranged to:
receiving a texture corresponding to the captured image, the texture having a mosaic pattern with a first, second and third color, each pixel in the texture having a color component from only one color of said first, second and third color, wherein 25% of the pixels in the texture have a color component from the first color, wherein 25% of the pixels in the texture have a color component from the second color, wherein 50% of the pixels in the texture have a color component from the third color,
from the texture, defining four grids, each grid defining a plurality of pixel positions in the texture, wherein a first grid define pixel positions of all pixels of the texture having a color component from the first color, wherein a second grid define pixel positions of all pixels of the texture having a color component from the second color, wherein a third grid define pixel positions of 50% of the pixels of the texture having a color component from the third color, wherein a fourth grid define pixel positions of a remaining 50% of the pixels of the texture having a color component from the third color,
for each grid and each pixel position in the grid, initiating a vertex shader and provide as a input to the vertex shader the pixel position, wherein the vertex shader extracts the color component corresponding to the pixel position in the texture and outputs the pixel position and the corresponding color component of the pixel position,
for each grid and using the output from the vertex shaders, defining a plurality instances of a patch primitive type, each instance of the patch primitive type comprising four pixel positions forming a quad, and the color component corresponding to each of the four pixel positions,
for each instance of the patch primitive type, initiating a geometry shader, and provide as a input to the geometry shader the instance of the patch primitive type, wherein the geometry shader define two instances of a triangle primitive type from the instance of the patch primitive type based on a order of the pixel positions comprised in the instance of the patch primitive type, wherein each instance of the triangle primitive type comprises three pixel positions forming a triangle, and the color components corresponding to each of the three pixel positions, and output the two instances of the triangle primitive type,
using a built-in rasterization function for rasterization of each instance of the triangle primitive type outputted by the geometry shaders, such that all pixel positions of the texture each corresponds to a color component of the first color, a color component of the second color and two color components of the third color,
inputting each pixel position of the texture and the corresponding color components of each of the first, second and third color to a pixel shader, and
forming an image based on outputs of the pixel shader, wherein all pixels of the image having a color component from each of the first, second and third color.

The second and third aspect may generally have the same features and advantages as the first aspect.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

Figure 1:
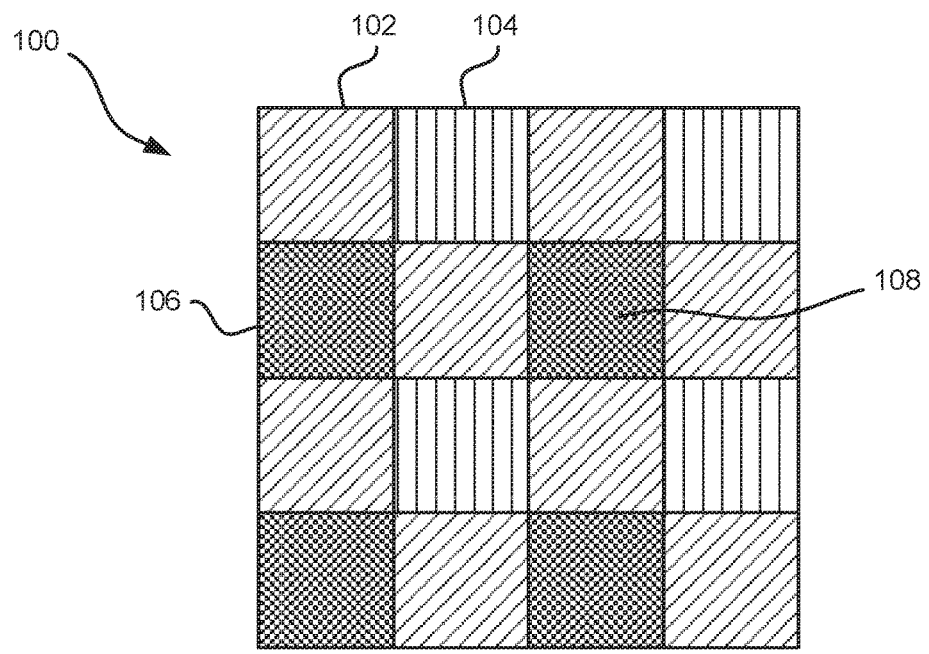
FIG. 1 shows a color filter array with a Bayer pattern.

A demosaicing (also de-mosaicing, demosaicking or debayering) algorithm is a digital image process used to reconstruct a full color image from the incomplete color samples output from an image sensor overlaid with a color filter array (CFA). It is also known as CFA interpolation or color reconstruction. Such an incomplete color sample 100, e.g. an image 100 captured by an image sensor comprising a CFA, is shown in FIG. 1. The color sample 100 has a mosaic pattern with a first 104, second 106 and third 102 color. Since image 100 are captured with a by an image sensor comprising a CFA (e.g. a RGBG filter, GRGB filter, RGGB filter and a CYYM filter), each pixel in the image has a color component from only one color of said first, second and third color. As can be seen in FIG. 1, 25% of the pixels in the texture have a color component from the first color 104, 25% of the pixels in the texture have a color component from the second color 106, and 50% of the pixels in the texture have a color component from the third color 102.

In the following, the CFA is exemplified as a RGBG filter, and the first color 104 thus corresponds to red, the second color 106 corresponds to blue and the third color 102 corresponds to green.

With demosaicing, the missing colors for each pixel are created. In the RGBG case, 3 cases exist. If the pixel is a "green pixel" 102 (the green color component), the red and blue color components have to be created. If the pixel is a "blue pixel" 106 (the blue color component), the red and green color components have to be created. If the pixel is a "red pixel" 104 (the red color component), the green and blue color component have to be created. Typically, demosaicing is done using interpolation in a hardware specifically dedicated for the demosaicing operation. For example, for the blue pixel 108, the following steps need to be performed:

Calculate the red component of pixel 108 by calculating the average of the 4 surrounding red pixels.

Calculate the green component of pixel 108 by calculating the average of the 4 surrounding green pixels.

After this, we have all 3 components of pixel 108.

The similar thing needs to be done to the rest of the pixels in the image 100.

However, the inventors have realized that if the GPU could be used for the interpolation, a much more energy efficient and cost efficient demosaicing method can be achieved since no additional hardware is needed and since the image data is transferred to the GPU anyway for further processing. Such methods, devices and computer program products will now be described in conjunction with FIGS. 2-8.

As mentioned above, the GPU will receive S802 a texture corresponding to the captured image 100. This is thus the raw image as captured by the image sensor of the camera. The texture have a mosaic pattern with a first 104, second 106 and third 102 color, each pixel in the texture having a color component from only one color of said first, second and third color, wherein 25% of the pixels in the texture have a color component from the first color 104 (e.g. red), wherein 25% of the pixels in the texture have a color component from the second color 106 (e.g. blue), wherein 50% of the pixels in the texture have a color component from the third color 102 (e.g. green).

Figure 2:
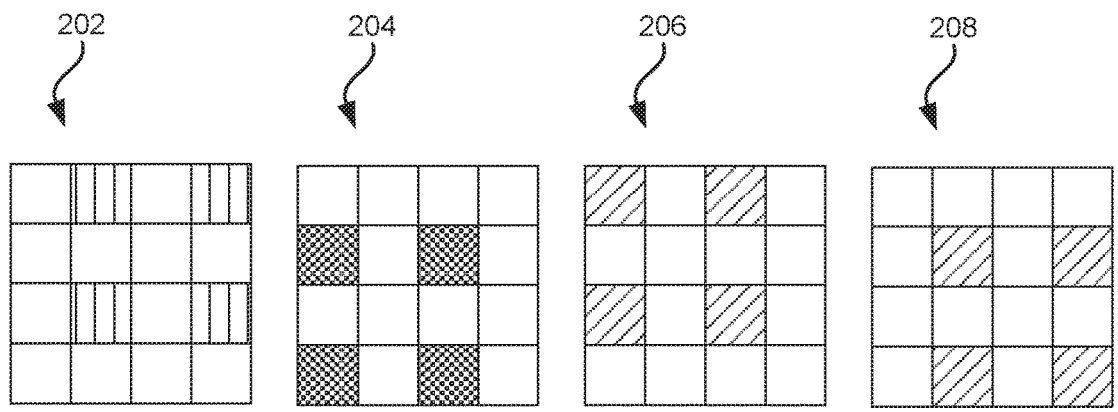
FIG. 2 shows four grids defined by the GPU from the Bayer pattern of FIG. 1.
Figure 3:
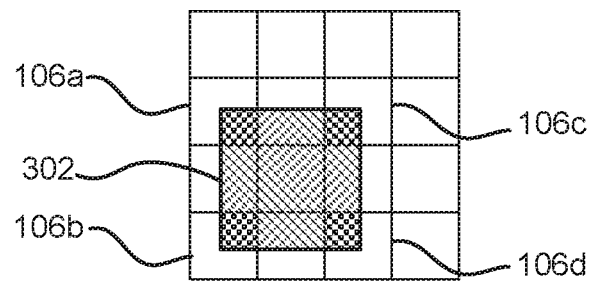
FIG. 3 shows by way of example a rasterization of a mosaiced image received by the GPU, using a fixed function interpolator of the GPU.

From the texture, the GPU may define S804 four grids 202-208, shown in FIG. 2. The first grid 202 defines pixel positions of all pixels of the texture having a color component from the first color 104 (red). The second grid 204 defines pixel positions of all pixels of the texture having a color component from the second color 106 (blue). The third grid 206 defines pixel positions of 50% of the pixels of the texture having a color component from the third color 102 (green). The fourth grid 208 defines pixel positions of a remaining 50% of the pixels of the texture having a color component from the third color 102 (green). By dividing the green pixels into two grids 206, 208, the same density and pattern of pixel positions in all grids will be achieved, and consequently the same method may be used for rasterization of all the tree colors 102, 104, 106. In other words, the same implementation of the vertex shader may be used for all grids.

According to some embodiments, the GPU may extract metadata defining a mosaic pattern from the texture, and defining the four grids based on the metadata. This may decrease the computational complexity. According to other embodiments, the mosaic pattern is defined by e.g. analyzing a small bit of the input texture, to extract the pattern. This may increase the flexibility since no metadata may be needed to define the pattern. According to some embodiments, the second, third and fourth grid is defined by shifting the positions of the first grid according to a predefined rule. Consequently, only one grid with pixel positions needs to be defined and stored in memory since the second, third and fourth grid with their respective pixel positions may be deduced from the one grid defined and stored in memory. In case the captured image always is of the same size, the grid may be hardcoded in memory. Otherwise, the size may be read from the captured image.

After the four grids 202-208 have been defined, the color components for each pixel position in the grids 202-208 need to be extracted S806. This may be done by, for each grid and each pixel position in the grid, initiating a vertex shader of the GPU and provide as an input to the vertex shader the pixel position. The input to a vertex shader is thus a single pixel position, and the output of the vertex shader is the pixel position and the corresponding color component of the pixel position, i.e. the color component from the pixel position in the texture having the mosaiced pattern. According to some embodiments, the extraction of the color value for each pixel position defined in a grid 202-208 may be performed in parallel. In other words, in case a grid 202-208 comprises e.g. 200 pixel positions, 200 vertex shaders may be initiated in parallel. Each of the 200 vertex shaders may then in parallel extract the respective color component by reading directly from the texture memory of the GPU. This may increase the speed of the demosaicing operation in the GPU.

The output from the vertex shaders are vertex points containing pixel position data and corresponding color component data of the pixel position data, read from the texture as described above.

After this, patches (patch primitive types) are instantiated and defined S810, where each instance of a patch comprises four pixel positions forming a quad, and the color component corresponding to each of the four pixel positions. The content of a patch is exemplified in FIG. 3 where four pixel positions 106a-d form a quad 302, and where the color components (blue in this case) of the pixel positions 106a-d extracted by the vertex shaders also are included in the patch.

For each such instance of the patch primitive type, a geometry shader of the GPU may be initiated. The input the geometry shader is the instance of the patch primitive type. The geometry shader may be arranged to define S814 two instances of a triangle primitive type from the instance of the patch primitive type based on an order of the pixel positions comprised in the instance of the patch primitive type. As described above, a triangle is a data structure formed by 3 vertices, and consequently, each instance of the triangle primitive type comprises three pixel positions forming a triangle, and the color components corresponding to each of the three pixel positions. The two defined instances of the triangle are then outputted from the geometry shader.

Figure 4:
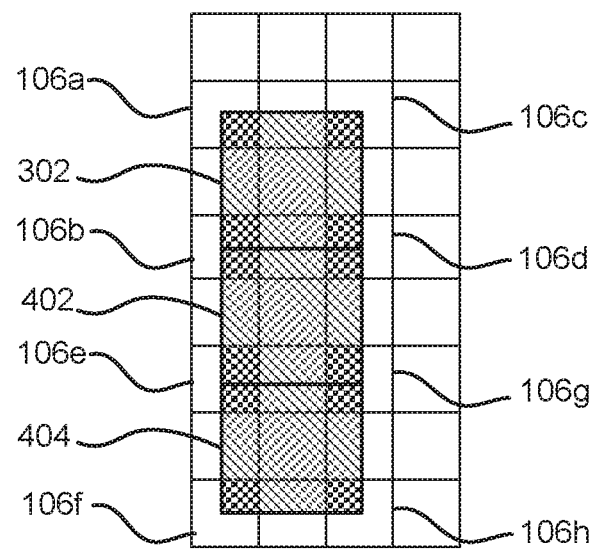
FIG. 4 shows rasterization according to FIG. 3 for adjacent quads.

As can be seen in FIG. 4, adjacent quads 302, 402, 404 share some vertices (pixel positions and thus corresponding color components). For example, the quad 302 is defined by the pixel positions 106a-d, and the quad 402 is defined by the pixel positions 106b, 106d, 106e, 106g, thus sharing two vertices with the neighboring quad 302.

Figure 5:
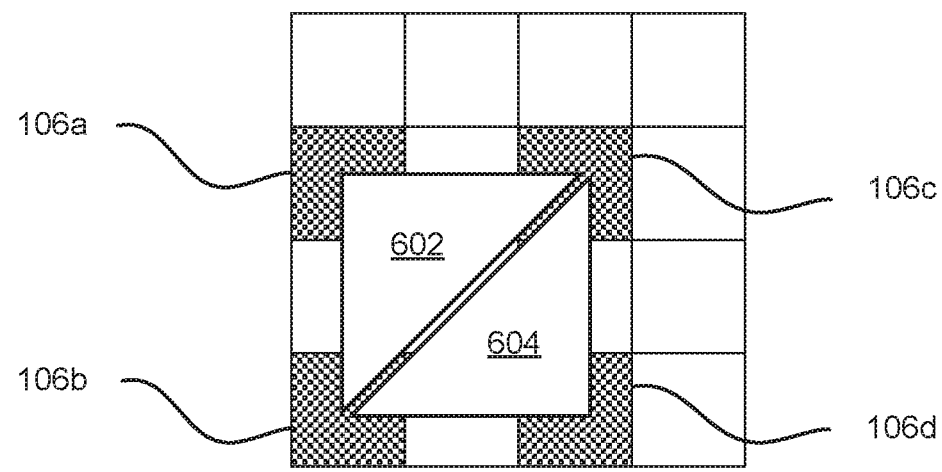
FIGS. 5-6 show ways of rasterization a quad, using two different diagonal settings.
Figure 6:
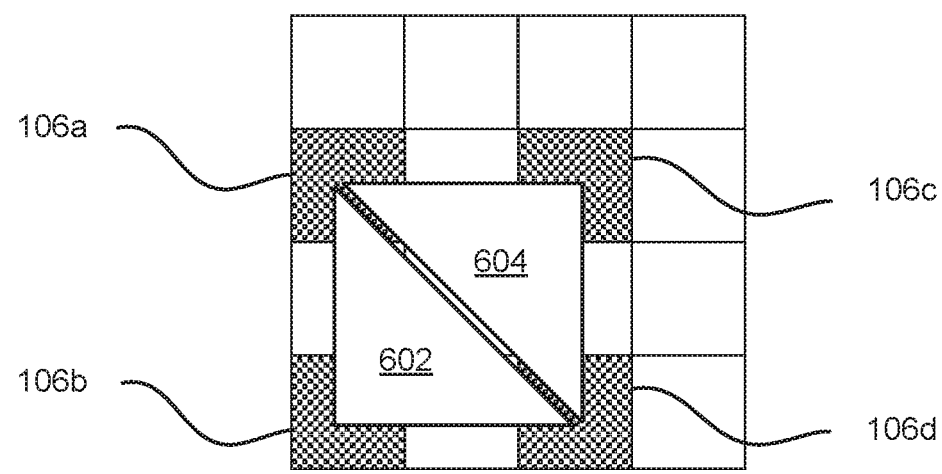

According to some embodiments, the defining of the two triangles may be content adaptive, in the sense that based on the differences between diagonally positioned pixels, different diagonal settings of the triangles may be employed. This is shown in FIGS. 5-6 where FIG. 5 shows two triangles 602, 604. The first triangle 602 is formed by the pixel positions 106a, 106b, and 106c, while the second triangle 604 is formed by the pixel positions 106b, 106c and 106d. In FIG. 6, another diagonal setting is used. In this setting, the first triangle 602 is formed by the pixel positions 106a, 106b, and 106d, while the second triangle 604 is formed by the pixel positions 106a, 106c and 106d. The selection between the diagonal settings may be done by calculating, by the geometry shader, a first difference between the color components corresponding to a upper left pixel position 106a in the quad, and a lower right pixel position 106d in the quad, and a second difference between the color components corresponding to a upper right pixel position 106c in the quad, and a lower left pixel position 106b in the quad. In case the first difference is larger than the second difference, the diagonal setting shown in FIG. 5 is selected; else the diagonal setting shown in FIG. 6 is selected. By doing this, the interpolation (to be described below) when there is an edge present in the region defined by the quad are improved. In other words, this embodiment provides a decision point in the algorithm that substantially improves visual quality of the resulting demosaiced image. With this addition, the interpolation is adaptive to the actual pixel values in the 3×3 pixel area (quad) and thus content adaptive. Consequently, the geometry shader may be arranged to, prior to the step of defining two instances of a triangle primitive type, calculate the above described differences and reorder S812 the pixel positions comprised in the instance of the patch primitive type in case it is needed, e.g. when the second difference is larger than the first difference.

After the triangles have been defined, the built-in rasterization function of the GPU can be used for rasterization S816 of each instance of the triangle primitive type outputted by the geometry shaders. In this ways, the already existing, fixed function (e.g. implemented in dedicated silicon in the GPU) rasterization functionality can be used for providing all pixel positions of the texture with color components of each of the first, second and third color. In this step, the raster data may be snapped to integer locations that are then culled and clipped (to draw the minimum number of pixels), and per-pixel attributes (e.g. the color component corresponding to the pixel position) are interpolated (from per-vertex attributes) before being passed to a pixel shader.

The rasterization rules of the GPU will be used for the rasterization, and example of such rules may be as defined for Direct3D version 11.

Since two grids exist for the third color (e.g. green), each pixel position will now correspond to two color components of the third color, and one color component of the first color and one color component of the second color. In other words, each pixel position (vertex) has 4 attributes, one attribute defining the color component of the first color, one attribute defining the color component of the second color, and two attributes defining the color components of the third color.

By using the built-in rasterization function of the GPU, each pixel position of the texture and the corresponding components of the first, second and third color will now automatically be inputted to the pixel shader of the GPU. The pixel shader is also known as "fragment shader", for example, in OpenGL.

Figure 7A:
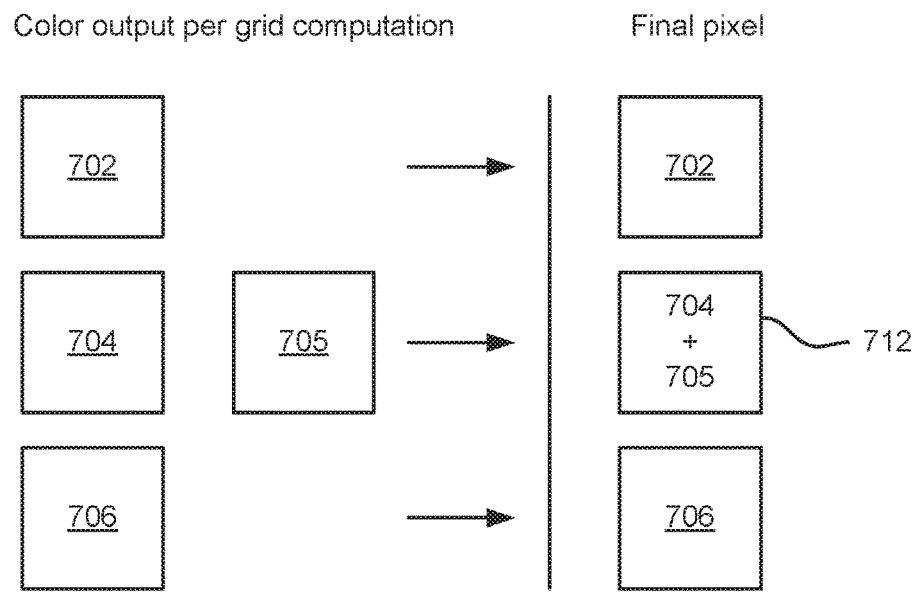
FIGS. 7a-b show two ways of defining color components of a final pixel according to embodiments.

Based on the outputs of the pixel shader, a complete image (all pixels of the image having a color component from each of the first, second and third color) may be formed S818. According to some embodiments, the pixel shader may perform an alpha blending operation. Consequently, the fixed function blend stage (using dedicated hardware of the GPU) may be employed for forming the final image. The alpha blending operation is performed on one of the color components corresponding to each pixel position inputted to the pixel shader. In this embodiment, each color channel is added to the final image using four rendering operations at the pixel shader. For each rendering operation, the color component for 100% of the first color or 100% of the color component for the second color or the color component for 50% of the third color is generated. Consequently, in case the alpha blending operation by the pixel shader is performed on the color component of the third channel, the pixel shader needs to, for each inputted pixel position of the texture and the corresponding color components of each of the first, second and third color, divide the corresponding color component of the third color by 2 (or multiplying with 0.5) before outputting the pixel position and the corresponding color components of each of the first, second and third color. The alpha blending operation is shown in FIG. 7a, and is thus a single pass solution where an additive blend is performed on color components 704, 705 (from the third color) which thus forms color component 712 (from the third color) in the final pixel. In this example, the final pixel is thus a pixel having an R-component 702, a G-component 712 and a B-component 706.

In another embodiment, no blending operation is performed by the pixel shader. In this case, the pixel shader is, for each inputted pixel position of the texture and the corresponding color components of each of the first, second and third color, outputting the pixel position and corresponding color components of each of the first, second and third color. In other words, the pixel shader outputs the interpolated colors of the first, second and third color for each pixel position (known as "pass-through" in the art). In this embodiment, the final image is formed by, for each pixel position, combining the corresponding color component of the first color, the corresponding color component of the second color and the two corresponding color components of the third color. Pseudo code for this may be as follows:

```
float3 FinalRGB( )
{
    return red + green1 + green2 + blue;
}
```

Figure 7B:
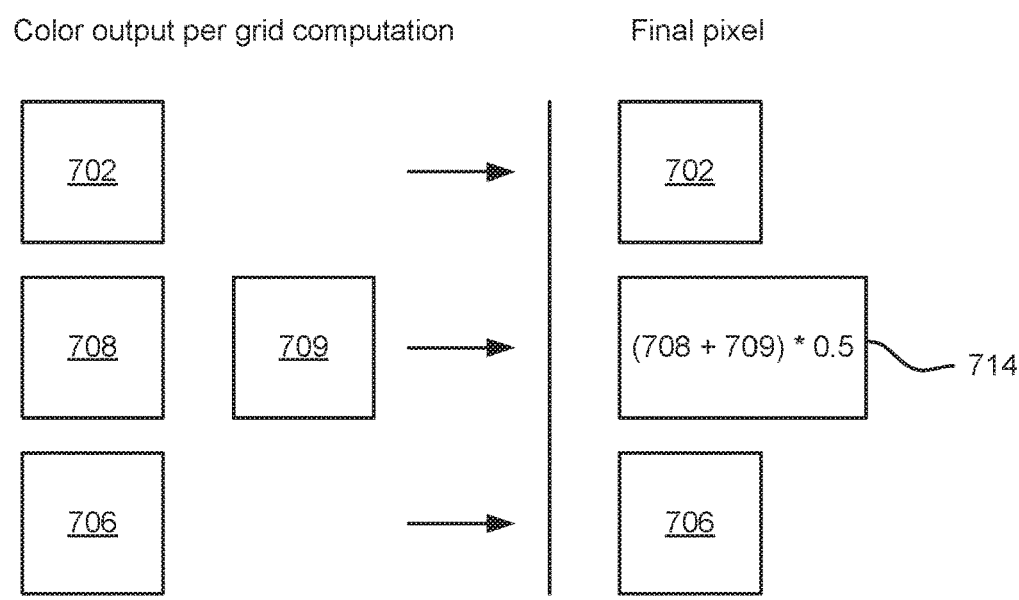
Figure 8:
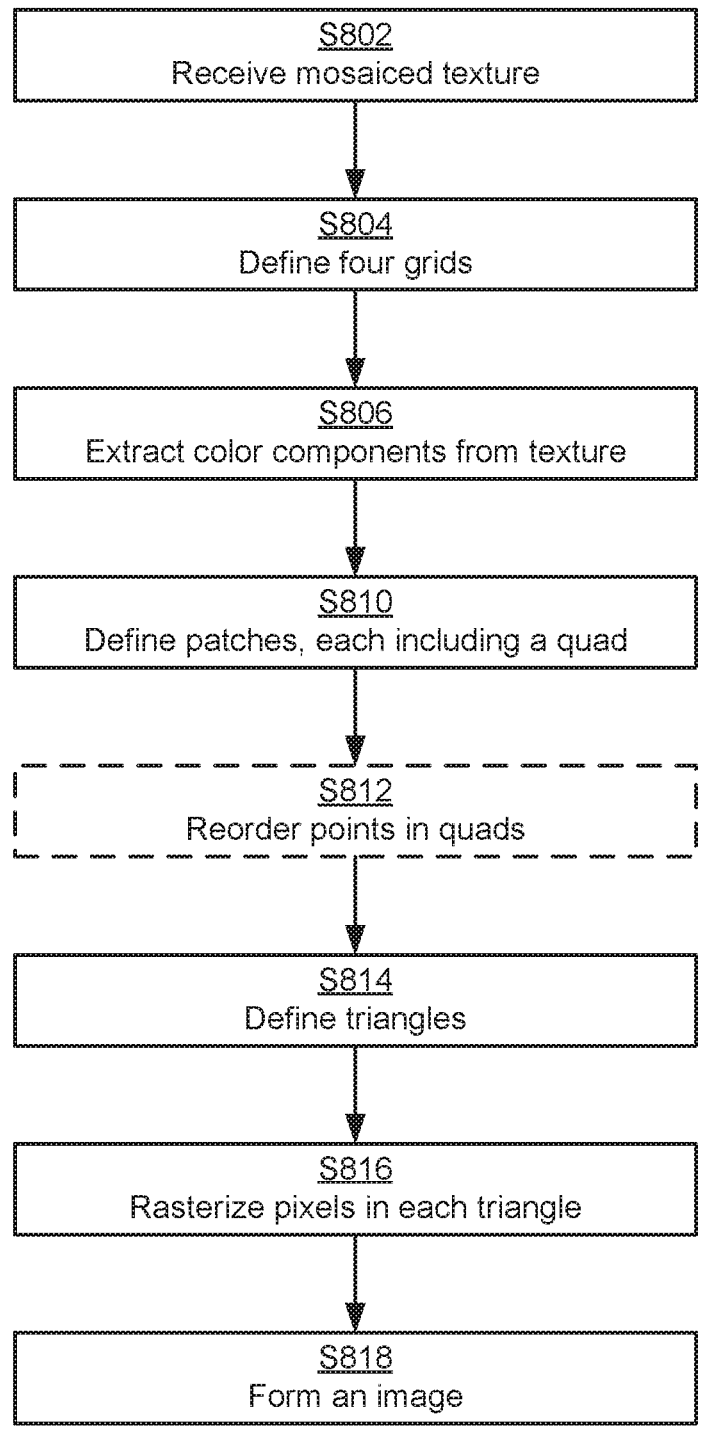
FIG. 8 shows a method for demosaicing an image captured by an image sensor comprising a color filter array.

To form the final pixel, a second calculation is needed, shown in FIG. 7b where the color component of the third color (e.g. green) is formed by adding the two color components 708, 709 of the third color (which where the outcome from the built-in rasterization function) and dividing the added values by 2 (or multiplying with 0.5) to form the final color component 714 of the third color. In this example, the final pixel is thus a pixel having an R-component 702, a G-component 714 and a B-component 706.

However, any of the combination functions for this embodiment may also include weight or similar for the color channels and this embodiment may thus be more flexible than performing the blending in the pixel shader (as shown in FIG. 7a and described above).

The invention claimed is:

1. A method for demosaicing an image captured by an image sensor comprising a color filter array, the method comprising:

receiving, by a graphical processing unit (GPU), a texture corresponding to the captured image, the texture having a mosaic pattern with a first, second and third color, each pixel in the texture having a color component from only one color of said first, second and third color, wherein 25% of the pixels in the texture have a color component from the first color, wherein 25% of the pixels in the texture have a color component from the second color, wherein 50% of the pixels in the texture have a color component from the third color;

from the texture, defining four grids, each grid defining a plurality of pixel positions in the texture, wherein a first grid define pixel positions of all pixels of the texture having a color component from the first color, wherein a second grid define pixel positions of all pixels of the texture having a color component from the second color, wherein a third grid define pixel positions of 50% of the pixels of the texture having a color component from the third color, wherein a fourth grid define pixel positions of a remaining 50% of the pixels of the texture having a color component from the third color;

for each grid and each pixel position in the grid, initiating a vertex shader of the GPU and providing as an input to the vertex shader the pixel position, wherein the vertex shader extracts the color component corresponding to the pixel position in the texture and outputs the pixel position and the corresponding color component of the pixel position;

for each grid and using the output from the vertex shaders, defining a plurality of instances of a patch primitive type, each instance of the patch primitive type comprising four pixel positions forming a quad, and the color component corresponding to each of the four pixel positions;

for each instance of the patch primitive type, initiating a geometry shader of the GPU, and providing as a input to the geometry shader the instance of the patch primitive type, wherein the geometry shader define two instances of a triangle primitive type from the instance of the patch primitive type based on an order of the pixel positions comprised in the instance of the patch primitive type, wherein each instance of the triangle primitive type comprises three pixel positions forming a triangle, and the color components corresponding to each of the three pixel positions, and output the two instances of the triangle primitive type;

using a built-in rasterization function of the GPU for rasterization of each instance of the triangle primitive type outputted by the geometry shaders of the GPU, such that all pixel positions of the texture each corresponds to a color component of the first color component, a color component of the second color and two color components of the third color;

inputting each pixel position of the texture and the corresponding color components of each of the first, second and third color to a pixel shader of the GPU; and forming an image based on outputs of the pixel shader, wherein all pixels of the image have a color component from each of the first, second and third color.

2. The method of claim 1, further comprising:

prior to the step of defining two instances of a triangle primitive type by the geometry shader, calculating, by the geometry shader, a first difference between the color components corresponding to a upper left pixel position in the quad, and a lower right pixel position in the quad, and a second difference between the color components corresponding to a upper right pixel position in the quad, and a lower left pixel position in the quad, and reorder the pixel positions comprised in the instance of the patch primitive type in case the second difference is larger than the first difference.

3. The method of claim 1, further comprising:

extracting metadata defining a mosaic pattern from the texture, wherein the step of defining the four grids is performed based on the metadata.

4. The method of claim 1, wherein the second, third and fourth grid is defined by shifting the positions of the first grid according to a predefined rule.

5. The method of claim 1, further comprising:

performing an alpha blending operation by the pixel shader on one of the color components corresponding to each pixel position inputted to the pixel shader.

6. The method of claim 5, wherein the alpha blending operation by the pixel shader is performed on the color component of the third channel, wherein the method further comprises:

by the pixel shader, for each inputted pixel position of the texture and the corresponding color components of each of the first, second and third color, dividing the corresponding color component of the third color by 2 before outputting the pixel position and the corresponding color components of each of the first, second and third color.

7. The method of claim 1, further comprising:
by the pixel shader, for each inputted pixel position of the texture and the corresponding color components of each of the first, second and third color, outputting the pixel position and corresponding color components of each of the first, second and third color, and wherein the step of forming an image comprises:
for each pixel position, combining the corresponding color component of the first color, the corresponding color component of the second color and the two corresponding color components of the third color.

8. The method of claim 1, wherein the color filter array corresponds to one from the list of: a RGBG filter, GRGB filter, RGGB filter and a CYYM filter.

9. A non-transitory computer-readable storage medium storing instructions that when executed by a device having processing capability perform a method of de-mosaicing an image captured by an image sensor comprising a color filter array, the method comprising:
receiving, by a graphical processing unit, GPU, a texture corresponding to the captured image, the texture having a mosaic pattern with a first, second and third color, each pixel in the texture having a color component from only one color of said first, second and third color, wherein 25% of the pixels in the texture have a color component from the first color, wherein 25% of the pixels in the texture have a color component from the second color, wherein 50% of the pixels in the texture have a color component from the third color;
defining four grids from the texture, each grid defining a plurality of pixel positions in the texture, wherein a first grid define pixel positions of all pixels of the texture having a color component from the first color, wherein a second grid define pixel positions of all pixels of the texture having a color component from the second color, wherein a third grid define pixel positions of 50% of the pixels of the texture having a color component from the third color, wherein a fourth grid define pixel positions of a remaining 50% of the pixels of the texture having a color component from the third color;
initiating a vertex shader of the GPU for each grid and each pixel position in the grid, and providing as an input to the vertex shader the pixel position, wherein the vertex shader extracts the color component corresponding to the pixel position in the texture and outputs the pixel position and the corresponding color component of the pixel position;
defining a plurality of instances of a patch primitive type for each grid and using the output from the vertex shaders, each instance of the patch primitive type comprising four pixel positions forming a quad, and the color component corresponding to each of the four pixel positions;
initiating a geometry shader of the GPU for each instance of the patch primitive type, and providing as a input to the geometry shader the instance of the patch primitive type, wherein the geometry shader defines two instances of a triangle primitive type from the instance of the patch primitive type based on an order of the pixel positions comprised in the instance of the patch primitive type, wherein each instance of the triangle primitive type comprises three pixel positions forming a triangle, and the color components corresponding to each of the three pixel positions, and output the two instances of the triangle primitive type;
using a built-in rasterization function of the GPU for rasterization of each instance of the triangle primitive type outputted by the geometry shaders of the GPU, such that all pixel positions of the texture each corresponds to a color component of the first color component, a color component of the second color and two color components of the third color;
inputting each pixel position of the texture and the corresponding color components of each of the first, second and third color to a pixel shader of the GPU; and
forming an image based on outputs of the pixel shader, wherein all pixels of the image have a color component from each of the first, second and third color.

10. A graphical processing unit, GPU, arranged for demosaicing an image captured by an image sensor comprising a color filter array, wherein the GPU is operable to:
receive an texture corresponding to the captured image, the texture having a mosaic pattern with a first, second and third color, each pixel in the texture having a color component from only one color of said first, second and third color, wherein 25% of the pixels in the texture have a color component from the first color, wherein 25% of the pixels in the texture have a color component from the second color, wherein 50% of the pixels in the texture have a color component from the third color;
from the texture, define four grids, each grid defining a plurality of pixel positions in the texture, wherein a first grid define pixel positions of all pixels of the texture having a color component from the first color, wherein a second grid define pixel positions of all pixels of the texture having a color component from the second color, wherein a third grid define pixel positions of 50% of the pixels of the texture having a color component from the third color, wherein a fourth grid define pixel positions of a remaining 50% of the pixels of the texture having a color component from the third color;
for each grid and each pixel position in the grid, initiate a vertex shader and provide as a input to the vertex shader the pixel position, wherein the vertex shader extracts the color component corresponding to the pixel position in the texture and outputs the pixel position and the corresponding color component of the pixel position;
for each grid and using the output from the vertex shaders, define a plurality of instances of a patch primitive type, each instance of the patch primitive type comprising four pixel positions forming a quad, and the color component corresponding to each of the four pixel positions;
for each instance of the patch primitive type, initiate a geometry shader, and provide as a input to the geometry shader the instance of the patch primitive type, wherein the geometry shader defines two instances of a triangle primitive type from the instance of the patch primitive type based on an order of the pixel positions comprised in the instance of the patch primitive type, wherein each instance of the triangle primitive type comprises three pixel positions forming a triangle, and the color components corresponding to each of the three pixel positions, and outputs the two instances of the triangle primitive type;
use a built-in rasterization function for rasterization of each instance of the triangle primitive type outputted by the geometry shaders, such that all pixel positions of the texture each corresponds to a color component of the first color, a color component of the second color and two color components of the third color;

input each pixel position of the texture and the corresponding color components of each of the first, second and third color to a pixel shader; and form an image based on outputs of the pixel shader, wherein all pixels of the image have a color component from each of the first, second and third color.

11. The GPU of claim 10, further being operable to:

prior to defining two instances of a triangle primitive type by the geometry shader, calculate, by the geometry shader, a first difference between the color components corresponding to a upper left pixel position in the quad, and a lower right pixel position in the quad, and a second difference between the color components corresponding to a upper right pixel position in the quad, and a lower left pixel position in the quad, and reorder the pixel positions comprised in the instance of the patch primitive type in case the second difference is larger than the first difference.

12. The GPU of claim 10, further being operable to extract metadata defining a mosaic pattern from the texture, wherein the step of defining the four grids is performed based on the metadata.

13. The GPU of claim 10, further being operable to define the second, third and fourth grid by shifting the positions of the first grid according to a predefined rule.

14. The GPU of claim 10, further being operable to perform an alpha blending operation by the pixel shader on one of the color components corresponding to each pixel position inputted to the pixel shader.

15. The GPU of claim 10, further being operable to:

by the pixel shader, for each inputted pixel position of the texture and the corresponding color components of each of the first, second and third color, output the pixel position and corresponding color components of each of the first, second and third color, and wherein the forming the image comprises:

for each pixel position, combining the corresponding color component of the first color, the corresponding color component of the second color and the two corresponding color components of the third color.

* * * * *